US011138656B2

United States Patent
Godsey

(10) Patent No.: US 11,138,656 B2
(45) Date of Patent: Oct. 5, 2021

(54) MOBILE APPLICATION TO CONDUCT AN AUCTION BASED ON PHYSICAL PRESENCE

(71) Applicant: eBay Inc., San Jose, CA (US)

(72) Inventor: Sandra Lynn Godsey, San Jose, CA (US)

(73) Assignee: eBay Inc., San Jose, CA (US)

(*) Notice: Subject to any disclaimer, the term of this patent is extended or adjusted under 35 U.S.C. 154(b) by 39 days.

(21) Appl. No.: 16/426,654

(22) Filed: May 30, 2019

(65) Prior Publication Data

US 2019/0279290 A1    Sep. 12, 2019

Related U.S. Application Data

(63) Continuation of application No. 15/688,226, filed on Aug. 28, 2017, now Pat. No. 10,395,307, which is a continuation of application No. 13/324,834, filed on Dec. 13, 2011, now Pat. No. 9,779,450.

(51) Int. Cl.
*G06Q 30/00* (2012.01)
*G06Q 30/08* (2012.01)
*G06Q 10/00* (2012.01)

(52) U.S. Cl.
CPC .............. *G06Q 30/08* (2013.01); *G06Q 10/00* (2013.01)

(58) Field of Classification Search
CPC .............................. G06Q 30/08; G06Q 10/10
See application file for complete search history.

(56) References Cited

U.S. PATENT DOCUMENTS

| 5,559,707 A | 9/1996 | Delorme et al. |
| 5,649,114 A | 7/1997 | Deaton et al. |
| 5,724,521 A | 3/1998 | Dedrick |
| 5,724,660 A | 3/1998 | Kauser et al. |
| 5,732,354 A | 3/1998 | MacDonald |
| 5,848,373 A | 12/1998 | DeLorme et al. |

(Continued)

FOREIGN PATENT DOCUMENTS

| WO | 2001/022326 A1 | 3/2001 |
| WO | 2003/075193 A1 | 9/2003 |

OTHER PUBLICATIONS

Chang, Hsin Hsin. "Task-technology fit and user acceptance of online auction." International Journal of Human-Computer Studies 68.1-2 (2010): 69-89.*

(Continued)

*Primary Examiner* — Kathleen Palavecino
(74) *Attorney, Agent, or Firm* — Schwegman Lundberg & Woessner, P.A.

(57) ABSTRACT

A mobile application to conduct an auction based on physical presence is provided. The mobile application may be provided by a system comprising one or more modules. A notification module may identify an item to be sold at an auction. If a pre-auction window time period has arrived, the notification module may transmit auction notification messages to a plurality of client devices located within a predefined geographical area. A bidding module may conduct the auction by providing an auction interface to the client devices within the predefined geographical area. The auction interface includes an option to bid on the item. A completion module may transmit a confirmation to a winning auction participant.

20 Claims, 8 Drawing Sheets

(56) References Cited

U.S. PATENT DOCUMENTS

| | | |
|---|---|---|
| 5,890,068 A | 3/1999 | Fattouche et al. |
| 5,938,721 A | 8/1999 | Dussell et al. |
| 5,946,687 A | 8/1999 | Gehani et al. |
| 5,948,040 A | 9/1999 | Delorme et al. |
| 6,014,090 A | 1/2000 | Rosen et al. |
| 6,069,570 A | 5/2000 | Herring |
| 6,091,956 A | 7/2000 | Hollenberg |
| 6,097,958 A | 8/2000 | Bergen |
| 6,122,520 A | 9/2000 | Want et al. |
| 6,154,172 A | 11/2000 | Piccionelli et al. |
| 6,157,841 A | 12/2000 | Bolduc et al. |
| 6,167,274 A | 12/2000 | Smith |
| 6,198,927 B1 | 3/2001 | Wright et al. |
| 6,204,812 B1 | 3/2001 | Fattouche |
| 6,208,297 B1 | 3/2001 | Fattouche et al. |
| 6,208,857 B1 | 3/2001 | Agre et al. |
| 6,243,588 B1 | 6/2001 | Koorapaty et al. |
| 6,246,861 B1 | 6/2001 | Messier et al. |
| 6,246,882 B1 | 6/2001 | Lachance |
| 6,259,381 B1 | 7/2001 | Small |
| 6,259,923 B1 | 7/2001 | Lim et al. |
| 6,266,014 B1 | 7/2001 | Fattouche et al. |
| 6,269,361 B1 | 7/2001 | Davis et al. |
| 6,314,365 B1 | 11/2001 | Smith |
| 6,317,684 B1 | 11/2001 | Roeseler et al. |
| 6,321,158 B1 | 11/2001 | Delorme et al. |
| 6,330,452 B1 | 12/2001 | Fattouche et al. |
| 6,341,255 B1 | 1/2002 | Lapidot |
| 6,347,230 B2 | 2/2002 | Koshima et al. |
| 6,356,543 B2 | 3/2002 | Hall et al. |
| 6,357,042 B2 | 3/2002 | Srinivasan |
| 6,374,176 B1 | 4/2002 | Schmier et al. |
| 6,374,177 B1 | 4/2002 | Lee et al. |
| 6,404,388 B1 | 6/2002 | Sollenberger et al. |
| 6,424,840 B1 | 7/2002 | Fitch et al. |
| 6,442,529 B1 | 8/2002 | Krishan et al. |
| 6,456,852 B2 | 9/2002 | Bar et al. |
| 6,477,363 B1 | 11/2002 | Ayoub et al. |
| 6,496,857 B1 | 12/2002 | Dustin et al. |
| 6,519,463 B2 | 2/2003 | Tendler |
| 6,529,159 B1 | 3/2003 | Fan et al. |
| 6,552,682 B1 | 4/2003 | Fan |
| 6,563,459 B2 | 5/2003 | Takenaga |
| 6,577,946 B2 | 6/2003 | Myr |
| 6,580,914 B1 | 6/2003 | Smith |
| 6,590,529 B2 | 7/2003 | Schwoegler |
| 6,590,533 B2 | 7/2003 | Sollenberger et al. |
| 6,618,593 B1 | 9/2003 | Drutman et al. |
| 6,664,922 B1 | 12/2003 | Fan |
| 6,690,322 B2 | 2/2004 | Shamoto et al. |
| 6,714,797 B1 | 3/2004 | Rautila |
| 6,718,551 B1 | 4/2004 | Swix et al. |
| 6,732,120 B1 | 5/2004 | Du |
| 6,741,188 B1 | 5/2004 | Miller et al. |
| 6,741,969 B1 * | 5/2004 | Chen ..................... G06Q 10/02 705/1.1 |
| 6,757,544 B2 | 6/2004 | Rangarajan et al. |
| 6,807,479 B2 | 10/2004 | Watanabe et al. |
| 6,819,919 B1 | 11/2004 | Tanaka |
| 7,082,365 B2 | 7/2006 | Sheha et al. |
| 7,092,702 B2 | 8/2006 | Cronin et al. |
| 7,130,622 B2 | 10/2006 | Vanska et al. |
| 7,138,913 B2 | 11/2006 | Mackenzie et al. |
| 7,142,858 B2 | 11/2006 | Aoki et al. |
| 7,164,986 B2 | 1/2007 | Humphries et al. |
| 7,196,639 B2 | 3/2007 | Joyce et al. |
| 7,197,719 B2 | 3/2007 | Doyle et al. |
| 7,199,815 B2 | 4/2007 | Aoyama |
| 7,203,502 B2 | 4/2007 | Wilson et al. |
| 7,203,598 B1 | 4/2007 | Whitsell |
| 7,213,214 B2 | 5/2007 | Baar et al. |
| 7,216,109 B1 | 5/2007 | Donner |
| 7,246,109 B1 | 7/2007 | Ramaswamy |
| 7,254,388 B2 | 8/2007 | Nam et al. |
| 7,273,172 B2 | 9/2007 | Olsen, III et al. |
| 7,385,499 B2 | 6/2008 | Horton et al. |
| 7,389,919 B2 | 6/2008 | Walker et al. |
| 7,502,133 B2 | 3/2009 | Fukunaga et al. |
| 7,532,899 B2 | 5/2009 | Wilson et al. |
| 7,657,436 B2 | 2/2010 | Elmore et al. |
| 7,668,931 B2 | 2/2010 | Parupudi et al. |
| 7,669,759 B1 | 3/2010 | Zettner |
| 7,706,740 B2 | 4/2010 | Collins et al. |
| 7,715,981 B2 | 5/2010 | Bradley et al. |
| 7,720,436 B2 | 5/2010 | Hamynen et al. |
| 7,720,844 B2 | 5/2010 | Chu et al. |
| 7,747,259 B2 | 6/2010 | Pande et al. |
| 7,751,971 B2 | 7/2010 | Chang et al. |
| 7,761,340 B2 | 7/2010 | Yee et al. |
| 7,848,765 B2 | 12/2010 | Phillips et al. |
| 7,909,326 B2 | 3/2011 | Walker et al. |
| 8,041,604 B1 | 10/2011 | Glaser |
| 8,095,428 B2 | 1/2012 | Penagulur et al. |
| 8,098,894 B2 | 1/2012 | Soderstrom |
| 8,099,109 B2 | 1/2012 | Altman et al. |
| 8,249,884 B2 | 8/2012 | Turner et al. |
| 8,326,315 B2 | 12/2012 | Phillips et al. |
| 8,355,948 B2 | 1/2013 | Mason |
| 8,371,502 B1 | 2/2013 | Galit et al. |
| 8,442,871 B2 | 5/2013 | Veres et al. |
| 8,463,295 B1 | 6/2013 | Caralis et al. |
| 8,650,072 B2 | 2/2014 | Mason et al. |
| 8,811,957 B2 | 8/2014 | Jovicic et al. |
| 8,868,443 B2 | 10/2014 | Yankovich et al. |
| 8,909,248 B2 | 12/2014 | Phillips et al. |
| 9,779,450 B2 | 10/2017 | Godsey |
| 10,395,307 B2 | 8/2019 | Godsey |
| 2001/0055976 A1 | 12/2001 | Crouch et al. |
| 2002/0046259 A1 | 4/2002 | Glorikian |
| 2002/0065689 A1 | 5/2002 | Bingham et al. |
| 2002/0078444 A1 | 6/2002 | Krewin |
| 2002/0082941 A1 | 6/2002 | Bird |
| 2002/0102967 A1 | 8/2002 | Chang et al. |
| 2002/0111154 A1 | 8/2002 | Eldering et al. |
| 2002/0115453 A1 | 8/2002 | Poulin et al. |
| 2002/0143930 A1 | 10/2002 | Babu et al. |
| 2002/0145984 A1 | 10/2002 | Babu et al. |
| 2002/0155844 A1 | 10/2002 | Rankin et al. |
| 2002/0160766 A1 | 10/2002 | Portman et al. |
| 2002/0198003 A1 | 12/2002 | Klapman |
| 2003/0004802 A1 | 1/2003 | Callegari |
| 2003/0007006 A1 | 1/2003 | Baar et al. |
| 2003/0037041 A1 | 2/2003 | Hertz |
| 2003/0040324 A1 | 2/2003 | Eldering et al. |
| 2003/0065805 A1 | 4/2003 | Melvin |
| 2003/0125043 A1 | 7/2003 | Silvester |
| 2003/0126150 A1 | 7/2003 | Chan |
| 2003/0130787 A1 | 7/2003 | Clapper |
| 2003/0139190 A1 | 7/2003 | Steelberg et al. |
| 2003/0216960 A1 | 11/2003 | Postrel |
| 2003/0220835 A1 | 11/2003 | Barnes, Jr. |
| 2004/0002359 A1 | 1/2004 | Deas et al. |
| 2004/0021567 A1 | 2/2004 | Dunn |
| 2004/0023666 A1 | 2/2004 | Moon et al. |
| 2004/0039579 A1 | 2/2004 | Chithambaram et al. |
| 2004/0043773 A1 | 3/2004 | Lee et al. |
| 2004/0111332 A1 | 6/2004 | Baar et al. |
| 2004/0139330 A1 | 7/2004 | Baar |
| 2004/0192339 A1 | 9/2004 | Wilson et al. |
| 2004/0192349 A1 | 9/2004 | Reilly |
| 2004/0203901 A1 | 10/2004 | Wilson et al. |
| 2004/0203931 A1 | 10/2004 | Karaoguz |
| 2004/0220821 A1 | 11/2004 | Ericsson et al. |
| 2005/0015300 A1 | 1/2005 | Smith et al. |
| 2005/0044032 A1 | 2/2005 | Lee |
| 2005/0064852 A1 | 3/2005 | Baldursson |
| 2005/0065916 A1 | 3/2005 | Ge et al. |
| 2005/0159883 A1 | 7/2005 | Humphries et al. |
| 2005/0240512 A1 | 10/2005 | Quintero et al. |
| 2005/0250516 A1 | 11/2005 | Shim |
| 2005/0278749 A1 | 12/2005 | Ewert et al. |
| 2006/0004646 A1 | 1/2006 | Schoen et al. |
| 2006/0047825 A1 | 3/2006 | Steenstra et al. |
| 2006/0064346 A1 | 3/2006 | Steenstra et al. |

(56) References Cited

U.S. PATENT DOCUMENTS

| | | | |
|---|---|---|---|
| 2006/0089792 | A1 | 4/2006 | Manber et al. |
| 2006/0098028 | A1 | 5/2006 | Baar |
| 2006/0099959 | A1 | 5/2006 | Staten et al. |
| 2006/0145837 | A1 | 7/2006 | Horton et al. |
| 2006/0148488 | A1 | 7/2006 | Syrbe |
| 2006/0218114 | A1 | 9/2006 | Weare et al. |
| 2006/0236257 | A1 | 10/2006 | Othmer et al. |
| 2006/0270421 | A1 | 11/2006 | Phillips et al. |
| 2006/0271281 | A1 | 11/2006 | Ahn |
| 2007/0015517 | A1 | 1/2007 | Casey |
| 2007/0024469 | A1 | 2/2007 | Chou |
| 2007/0083437 | A1 | 4/2007 | Hamor |
| 2007/0100740 | A1 | 5/2007 | Penagulur et al. |
| 2007/0118430 | A1 | 5/2007 | Wiseman et al. |
| 2007/0124229 | A1 | 5/2007 | Ku et al. |
| 2007/0165050 | A1 | 7/2007 | Baar |
| 2007/0202844 | A1 | 8/2007 | Wilson et al. |
| 2007/0244633 | A1 | 10/2007 | Phillips et al. |
| 2008/0035725 | A1 | 2/2008 | Jambunathan et al. |
| 2008/0040216 | A1 | 2/2008 | Dellovo |
| 2008/0046415 | A1 | 2/2008 | Henkin et al. |
| 2008/0070588 | A1 | 3/2008 | Morin |
| 2008/0102947 | A1 | 5/2008 | Hays et al. |
| 2008/0109301 | A1* | 5/2008 | Yee .................. G06Q 40/04 705/14.27 |
| 2008/0126251 | A1 | 5/2008 | Wassingbo |
| 2008/0126515 | A1 | 5/2008 | Chambers et al. |
| 2008/0177749 | A1 | 7/2008 | Overton |
| 2008/0248815 | A1 | 10/2008 | Busch |
| 2008/0262958 | A1 | 10/2008 | Ku et al. |
| 2008/0290987 | A1 | 11/2008 | Li |
| 2008/0313078 | A1 | 12/2008 | Payne et al. |
| 2009/0005077 | A1 | 1/2009 | Forstall et al. |
| 2009/0024476 | A1 | 1/2009 | Baar et al. |
| 2009/0037101 | A1 | 2/2009 | Koike et al. |
| 2009/0061884 | A1 | 3/2009 | Rajan et al. |
| 2009/0063229 | A1 | 3/2009 | Coladonato et al. |
| 2009/0076911 | A1 | 3/2009 | Vo et al. |
| 2009/0076925 | A1 | 3/2009 | DeWitt et al. |
| 2009/0099951 | A1 | 4/2009 | Pandurangan |
| 2009/0100037 | A1 | 4/2009 | Scheibe |
| 2009/0132961 | A1 | 5/2009 | Baar |
| 2009/0156234 | A1 | 6/2009 | Sako et al. |
| 2009/0198607 | A1 | 8/2009 | Badger et al. |
| 2009/0204672 | A1 | 8/2009 | Jetha et al. |
| 2010/0293068 | A1* | 11/2010 | Drakoulis .............. G06Q 40/04 705/26.3 |
| 2011/0047075 | A1 | 2/2011 | Fourez |
| 2011/0173062 | A1 | 7/2011 | Chen et al. |
| 2011/0212717 | A1 | 9/2011 | Rhoads et al. |
| 2011/0238472 | A1 | 9/2011 | Sunkada |
| 2011/0238476 | A1 | 9/2011 | Carr et al. |
| 2011/0307338 | A1 | 12/2011 | Carlson |
| 2012/0126974 | A1 | 5/2012 | Phillips et al. |
| 2012/0129553 | A1 | 5/2012 | Phillips et al. |
| 2012/0130796 | A1 | 5/2012 | Busch |
| 2012/0150619 | A1 | 6/2012 | Jacob et al. |
| 2012/0191551 | A1 | 7/2012 | Lutnick et al. |
| 2012/0239483 | A1 | 9/2012 | Yankovich et al. |
| 2012/0239501 | A1 | 9/2012 | Yankovich et al. |
| 2013/0006735 | A1 | 1/2013 | Koenigsberg et al. |
| 2013/0110624 | A1 | 5/2013 | Mitrovic |
| 2013/0150086 | A1 | 6/2013 | Caralis et al. |
| 2013/0151366 | A1 | 6/2013 | Godsey |
| 2013/0173377 | A1 | 7/2013 | Keller et al. |
| 2013/0262231 | A1 | 10/2013 | Glasgow et al. |
| 2013/0346233 | A1 | 12/2013 | Caralis et al. |
| 2015/0006291 | A1 | 1/2015 | Yankovich et al. |
| 2015/0032531 | A1 | 1/2015 | Yankovich et al. |
| 2015/0065177 | A1 | 3/2015 | Phillips et al. |
| 2015/0148078 | A1 | 5/2015 | Phillips et al. |
| 2015/0163632 | A1 | 6/2015 | Phillips et al. |
| 2017/0358026 | A1 | 12/2017 | Godsey |

OTHER PUBLICATIONS

Preliminary Amendment for U.S. Appl. No. 15/688,226, filed Aug. 29, 2017, 6 pages.
Response to Non-Final Office Action filed Feb. 22, 2019, for U.S. Appl. No. 15/688,226, dated Oct. 30, 2018, 20 pages.
Non-Final Office Action received for U.S. Appl. No. 15/688,226, dated Oct. 30, 2018, 17 pages.
Notice of Allowance received for U.S. Appl. No. 15/688,226, dated Apr. 9, 2019, 12 pages.
Wikipedia, "Foursquare", Retrieved from the Internet URL: <https://en.wikipedia.org/wiki/Foursquare>, Accessed on Apr. 16, 2013, 13 pages.
"Halfbakery: Buddy Locator", Retrieved from the Internet URL: <http://www.halfbakery.com/idea/Buddy_20Locator#1055455737>, Jun. 11, 2003, 3 pages.
"Halfbakery: Mobile Phone Utility", Retrieved from the Internet Url: <http://www.halfbakery.com/idea/mobile_20phone_20utility#1073585857>, Jan. 8, 2004, 2 pages.
"Halfbakery: Mobile Proximity Link", Retrieved from the Internet URL: <http://www.halfbakery.com/idea/Mobile_20Proximity_20Link#1001923289>, Sep. 30, 2001, 2 pages.
"Networks in Motion Named Semi-Finalist for Wireless LBS Challenge", Retrieved from the Internet URL: <http://www.usdatanow.com/NetworksInMotion.htm>, Mar. 18, 2004, 2 pages.
"SignalSoft Corporation Awarded Location-Based Services Patent", Retrieved from the Internet URL: <http://www.cellular.co.za/news_2001/04282001-signalsoft-patent.htm>, Apr. 27, 2001, 1 page.
Final Office Action received for U.S. Appl. No. 11/140,273, dated Dec. 13, 2007, 11 pages.
Final Office Action received for U.S. Appl. No. 11/140,273, dated Jul. 15, 2009, 11 pages.
Non-Final Office Action received for U.S. Appl. No. 11/140,273, dated Feb. 26, 2010, 11 pages.
Non-Final Office Action received for U.S. Appl. No. 11/140,273, dated Jul. 3, 2008, 11 pages.
Non-Final Office Action received for U.S. Appl. No. 11/140,273, dated May 31, 2007, 10 pages.
Notice of Allowance received for U.S. Appl. No. 11/140,273, dated Aug. 3, 2008, 6 pages.
Preliminary Amendment for U.S. Appl. No. 11/140,273, filed Aug. 30, 2005, 32 pages.
Response to Final Office Action filed Apr. 14, 2008, for U.S. Appl. No. 11/140,273, dated Dec. 13, 2007, 13 pages.
Response to Final Office Action filed May 27, 2007, for U.S. Appl. No. 11/140,273, dated Dec. 13, 2007, 18 pages.
Response to Final Office Action filed Nov. 16, 2009, for U.S. Appl. No. 11/140,273, dated Jul. 15, 2009, 14 pages.
Response to Non-Final Office Action filed May 26, 2010, for U.S. Appl. No. 11/140,273, dated Feb. 26, 2010, 13 pages.
Response to Non-Final Office Action filed Nov. 27, 2007, for U.S. Appl. No. 11/140,273, dated May 31, 2007, 12 pages.
Response to Non-Final Office Action filed Oct. 7, 2008, for U.S. Appl. No. 11/140,273, dated Jul. 3, 2008, 15 pages.
Response to Restriction Requirement filed Apr. 21, 2009, for U.S. Appl. No. 11/140,273, dated Jan. 21, 2009, 10 pages.
Response to Restriction Requirement filed Mar. 20, 2007, for U.S. Appl. No. 11/140,273, 10 pages.
Restriction Requirement received for U.S. Appl. No. 11/140,273, dated Feb. 21, 2007, 5 pages.
Restriction Requirement received for U.S. Appl. No. 11/140,273, dated Jan. 21, 2009, 6 pages.
Advisory Action received for U.S. Appl. No. 11/593,047, dated Jan. 29, 2010, 4 pages.
Applicant-Initiated Interview Summary received for U.S. Appl. No. 11/593,047, dated Jul. 24, 2014, 2 pages.
Applicant-Initiated Interview Summary received for U.S. Appl. No. 11/593,047, dated Mar. 12, 2010, 4 pages.
Final Office Action received for U.S. Appl. No. 11/593,047, dated Dec. 1, 2009, 19 pages.
Non-Final Office Action received for U.S. Appl. No. 11/593,047, dated Feb. 2, 2009, 18 pages.

(56) References Cited

OTHER PUBLICATIONS

Non-Final Office Action received for U.S. Appl. No. 11/593,047, dated Mar. 11, 2014, 18 pages.
Non-Final Office Action received for U.S. Appl. No. 11/593,047, dated Sep. 4, 2009, 13 pages.
Response to Applicant Interview Summary filed Mar. 15, 2010, for U.S. Appl. No. 11/593,047, dated Mar. 10, 2010, 2 pages.
Response to Final Office Action filed Jan. 22, 2010, for U.S. Appl. No. 11/593,047, dated Dec. 1, 2009, 23 pages.
Response to Non-Final Office Action filed Apr. 20, 2009, for U.S. Appl. No. 11/593,047, dated Feb. 2, 2009, 33 pages.
Response to Non-Final Office Action filed Jul. 29, 2014, for U.S. Appl. No. 11/593,047, dated Mar. 11, 2014, 10 pages.
Response to Non-Final Office Action filed Nov. 16, 2009, for U.S. Appl. No. 11/593,047, dated Sep. 4, 2009, 20 pages.
Response to Supplemental Amendment filed Mar. 18, 2010, for U.S. Appl. No. 11/593,047, dated Mar. 10, 2010, 12 pages.
Applicant-Initiated Interview Summary received for U.S. Appl. No. 11/690,720, dated Feb. 22, 2012, 3 pages.
Final Office Action received for U.S. Appl. No. 11/690,720, dated Apr. 27, 2010, 10 pages.
Final Office Action received for U.S. Appl. No. 11/690,720, dated Nov. 9, 2011, 17 pages.
Non-Final Office Action received for U.S. Appl. No. 11/690,720, dated May 17, 2011, 11 pages.
Non-Final Office Action received for U.S. Appl. No. 11/690,720, dated Sep. 25, 2009, 8 pages.
Notice of Allowance received for U.S. Appl. No. 11/690,720, dated May 15, 2012, 7 pages.
Notice of Allowance received for U.S. Appl. No. 11/690,720, dated Aug. 2, 2012, 7 pages.
Preliminary Amendment for U.S. Appl. No. 11/690,720, filed Mar. 23, 2007, 8 pages.
Response to Final Office Action filed Feb. 15, 2012, for U.S. Appl. No. 11/690,720, dated Nov. 9, 2011, 14 pages.
Response to Non-Final Office Action filed Aug. 17, 2011, for U.S. Appl. No. 11/690,720, dated May 17, 2011, 13 pages.
Response to Non-Final Office Action filed Jan. 28, 2010, for U.S. Appl. No. 11/690,720, dated Sep. 25, 2010, 11 pages.
Response to Non-Final Office Action filed Aug. 25, 2010, for U.S. Appl. No. 11/690,720, dated Apr. 27, 2010, 11 pages.
Final Office Action received for U.S. Appl. No. 12/175,512, dated Dec. 7, 2011, 13 pages.
Non-Final Office Action received for U.S. Appl. No. 12/175,512, dated Jul. 26, 2011, 12 pages.
Non-Final Office Action received for U.S. Appl. No. 14/486,518, dated Nov. 30, 2016, 13 pages.
Preliminary Amendment for U.S. Appl. No. 14/486,518, filed Oct. 8, 2014, 9 pages.
Final Office Action received for U.S. Appl. No. 13/339,235, dated Jan. 27, 2017, 16 pages.
Non-Final Office Action received for U.S. Appl. No. 13/339,235, dated Aug. 18, 2014, 4 pages.
Non-Final Office Action received for U.S. Appl. No. 13/339,235, dated Feb. 12, 2015, 4 pages.
Non-Final Office Action received for U.S. Appl. No. 13/339,235, dated Mar. 16, 2012, 10 pages.
Non-Final Office Action received for U.S. Appl. No. 13/339,235, dated May 16, 2016, 15 pages.
Non-Final Office Action received for U.S. Appl. No. 13/339,235, dated Sep. 18, 2015, 14 pages.
Notice of Allowance received for U.S. Appl. No. 13/339,235, dated Apr. 25, 2014, 8 pages.
Response to Final Office Action filed Apr. 27, 2017, for U.S. Appl. No. 13/339,235, dated Jan. 27, 2017, 23 pages.
Response to Final Office Action filed Feb. 2, 2015, for U.S. Appl. No. 13/339,235, dated Dec. 2, 2014, 12 pages.
Response to Final Office Action filed Nov. 29, 2012, for U.S. Appl. No. 13/339,235, dated Aug. 29, 2012, 11 pages.
Response to Non-Final Office Action filed Aug. 16, 2016, for U.S. Appl. No. 13/339,235, dated May 16, 2016, 23 pages.
Response to Non-Final Office Action filed Jan. 19, 2016, for U.S. Appl. No. 13/339,235, dated Sep. 18, 2015, 21 pages.
Response to Non-Final Office Action filed Jun. 15, 2012, for U.S. Appl. No. 13/339,235, dated Mar. 16, 2012, 11 pages.
Response to Non-Final Office Action filed May 12, 2015, for U.S. Appl. No. 13/339,235, dated Feb. 12, 2015, 33 pages.
Response to Non-Final Office Action filed Nov. 18, 2014, for U.S. Appl. No. 13/339,235, dated Aug. 18, 2014, 20 pages.
Advisory Action received for U.S. Appl. No. 13/340,970, dated Feb. 13, 2014, 3 pages.
Final Office Action received for U.S. Appl. No. 13/340,970, dated Sep. 26, 2013, 18 pages.
Non-Final Office Action received for U.S. Appl. No. 13/340,970, dated Apr. 12, 2013, 17 pages.
Response to Advisory Action filed Feb. 25, 2014, for U.S. Appl. No. 13/340,970, dated Feb. 13, 2014, 10 pages.
Response to Final Office Action filed Jan. 27, 2014, for U.S. Appl. No. 13/340,970, dated Sep. 26, 2013, 10 pages.
Response to Non-Final Office Action filed Jul. 12, 2013, for U.S. Appl. No. 13/340,970, dated Apr. 12, 2013, 10 pages.
Amendment filed Oct. 29, 2014, for U.S. Appl. No. 13/361,113, 6 pages.
Non-Final Office Action received for U.S. Appl. No. 13/361,113, dated Feb. 13, 2014, 13 pages.
Notice of Allowance received for U.S. Appl. No. 13/361,113, dated Aug. 1, 2014, 8 pages.
PTO Response to Rule 312 Amendment for U.S. Appl. No. 13/361,113, dated Nov. 6, 2014, 2 pages.
Response to Non-Final Office Action filed May 13, 2014, for U.S. Appl. No. 13/361,113, dated Feb. 13, 2014, 13 pages.
Supplemental Notice of Allowability received for U.S. Appl. No. 13/361,113, dated Sep. 17, 2014, 2 pages.
Applicant-Initiated Interview Summary received for U.S. Appl. No. 13/361,196, dated Apr. 22, 2013, 3 pages.
Final Office Action received for U.S. Appl. No. 13/361,196, dated Jan. 22, 2013, 15 pages.
Non-Final Office Action received for U.S. Appl. No. 13/361,196, dated Aug. 23, 2012, 13 pages.
Non-Final Office Action received for U.S. Appl. No. 13/361,196, dated Jan. 3, 2014, 11 pages.
Non-Final Office Action received for U.S. Appl. No. 13/361,196, dated Mar. 29, 2012, 12 pages.
Notice of Allowance received for U.S. Appl. No. 13/361,196, dated Jun. 10, 2014, 8 pages.
Response to Final Office Action filed Apr. 18, 2013, for U.S. Appl. No. 13/361,196 dated Jan. 22, 2013, 10 pages.
Response to Non-Final Office Action filed Apr. 2, 2014, for U.S. Appl. No. 13/361,196, dated Jan. 3, 2014, 7 pages.
Response to Non-Final Office Action filed Jun. 21, 2012, for U.S. Appl. No. 13/361,196, dated Mar. 29, 2012, 9 pages.
Response to Non-Final Office Action filed Nov. 21, 2012, for U.S. Appl. No. 13/361,196, dated Aug. 23, 2012, 13 pages.
Final Office Action received for U.S. Appl. No. 14/486,518, dated Dec. 8, 2015, 7 pages.
Non-Final Office Action received for U.S. Appl. No. 14/486,518, dated May 21, 2015, 9 pages.
Applicant-Initiated Interview Summary received for U.S. Appl. No. 13/436,370, dated May 7, 2015, 3 pages.
Final Office Action received for U.S. Appl. No. 13/436,370, dated Jun. 12, 2015, 18 pages.
Final Office Action received for U.S. Appl. No. 13/436,370, dated Oct. 13, 2016, 14 pages.
Non-Final Office Action received for U.S. Appl. No. 13/436,370, dated Mar. 25, 2016, 18 pages.
Non-Final Office Action received for U.S. Appl. No. 13/436,370, dated Nov. 5, 2014, 15 pages.
Response to Final Office Action filed Oct. 6, 2015, for U.S. Appl. No. 13/436,370, dated Jun. 12, 2015, 20 pages.
Response to Non-Final Office Action filed Aug. 25, 2016, for U.S. Appl. No. 13/436,370, dated Mar. 25, 2016, 15 pages.

(56) References Cited

OTHER PUBLICATIONS

Response to Non-Final Office Action filed May 4, 2015, for U.S. Appl. No. 13/436,370, dated Nov. 5, 2014, 30 pages.
Preliminary Amendment for U.S. Appl. No. 13/913,768, filed Dec. 3, 2013, 8 pages.
Final Office Action received for U.S. Appl. No. 13/339,235, dated Dec. 2, 2014, 7 pages.
Response to Final Office Action filed Mar. 7, 2012, for U.S. Appl. No. 12/175,512, dated Dec. 7, 2011, 10 pages.
Response to Non-Final Office Action filed Nov. 28, 2011, for U.S. Appl. No. 12/175,512, dated Aug. 1, 2011, 12 pages.
Final Office Action received for U.S. Appl. No. 12/268,693, dated Dec. 1, 2011, 20 pages.
Non-Final Office Action received for U.S. Appl. No. 12/268,693, dated Aug. 8, 2011, 16 pages.
Response to Final Office Action filed Jun. 1, 2012, for U.S. Appl. No. 12/268,693, dated Dec. 2, 2011, 11 pages.
Response to Restriction Requirement filed Nov. 8, 2011, for U.S. Appl. No. 12/268,693, dated Aug. 8, 2011, 11 pages.
Final Office Action received for U.S. Appl. No. 12/369,068, dated Aug. 19, 2011, 17 pages.
Non-Final Office Action received for U.S. Appl. No. 12/369,068, dated Dec. 8, 2010, 19 pages.
Non-Final Office Action received for U.S. Appl. No. 12/369,068, dated Oct. 8, 2013, 19 pages.
Response to Final Office Action filed Nov. 21, 2011, for U.S. Appl. No. 12/369,068, dated Aug. 19, 2011, 12 pages.
Response to Non-Final Office Action filed Feb. 10, 2014, for U.S. Appl. No. 12/369,068, dated Oct. 8, 2013, 14 pages.
Response to Non-Final Office Action filed Jun. 8, 2011, for U.S. Appl. No. 12/369,068, dated Dec. 8, 2010, 19 pages.
312 Amendment filed for U.S. Appl. No. 13/050,769, dated Sep. 16, 2014, 3 pages.
Final Office Action received for U.S. Appl. No. 13/050,769, dated Jun. 17, 2013, 10 pages.
Non-Final Office Action received for U.S. Appl. No. 13/050,769, dated Jan. 11, 2013, 10 pages.
Notice of Allowance received for U.S. Appl. No. 13/050,769, dated Jun. 16, 2014, 8 pages.
PTO Response to 312 Amendment for U.S. Appl. No. 13/050,769, dated Sep. 25, 2014, 2 pages.
Response to Final Office Action filed Sep. 5, 2013, for U.S. Appl. No. 13/050,769, dated Jun. 17, 2013, 14 pages.
Response to Non-Final Office Action filed Apr. 9, 2013, for U.S. Appl. No. 13/050,769, dated Jan. 11, 2013, 15 pages.
Applicant-Initiated Interview Summary received for U.S. Appl. No. 13/282,199, dated Jul. 22, 2014, 3 pages.
Final Office Action received for U.S. Appl. No. 13/282,199, dated Sep. 26, 2013, 25 pages.
Non-Final Office Action received for U.S. Appl. No. 13/282,199, dated Apr. 9, 2014, 28 pages.
Non-Final Office Action received for U.S. Appl. No. 13/282,199, dated Apr. 29, 2013, 20 pages.
Response to Non-Final Office Action filed Aug. 28, 2013, for U.S. Appl. No. 13/282,199, dated Apr. 29, 2013, 16 pages.
Response to Non-Final Office Action filed Jan. 27, 2014, for U.S. Appl. No. 13/282,199, dated Sep. 26, 2013, 14 pages.
Response to Non-Final Office Action filed Jul. 17, 2014, for U.S. Appl. No. 13/282,199, dated Apr. 9, 2014, 16 pages.
Response to Restriction Requirement filed Apr. 4, 2013, for U.S. Appl. No. 13/282,199, dated Mar. 7, 2013, 10 pages.
Restriction Requirement received for U.S. Appl. No. 13/282,199, dated Mar. 7, 2013, 8 pages.
Non-Final Office Action received for U.S. Appl. No. 13/313,681, dated Aug. 21, 2012, 23 pages.
Notice of Allowance received for U.S. Appl. No. 13/313,681, dated Feb. 7, 2013, 13 pages.
Response to Non-Final Office Action filed Jan. 21, 2013, for U.S. Appl. No. 13/313,681, dated Aug. 21, 2012, 10 pages.

Amendment filed Jun. 13, 2017, for U.S. Appl. No. 13/324,834, 8 pages.
Applicant-Initiated Interview Summary received for U.S. Appl. No. 13/324,834, dated May 6, 2016, 3 pages.
Applicant-Initiated Interview Summary received for U.S. Appl. No. 13/324,834, dated Oct. 31, 2016, 3 pages.
Final Office Action received for U.S. Appl. No. 13/324,834, dated Apr. 28, 2015, 20 pages.
Final Office Action received for U.S. Appl. No. 13/324,834, dated Aug. 2, 2016, 16 pages.
Final Office Action received for U.S. Appl. No. 13/324,834, dated Jan. 13, 2014, 13 pages.
Non-Final Office Action received for U.S. Appl. No. 13/324,834, dated Aug. 14, 2013, 12 pages.
Non-Final Office Action received for U.S. Appl. No. 13/324,834, dated Aug. 27, 2014, 16 pages.
Non-Final Office Action received for U.S. Appl. No. 13/324,834, dated Mar. 9, 2016, 19 pages.
Notice of Allowance received for U.S. Appl. No. 13/324,834, dated May 30, 2017, 10 pages.
Response to Final Office Action filed Apr. 14, 2014, for U.S. Appl. No. 13/324,834, dated Jan. 13, 2014, 9 pages.
Response to Final Office Action filed Jul. 28, 2015, for U.S. Appl. No. 13/324,834, dated Apr. 28, 2015, 19 pages.
Response to Final Office Action filed Nov. 2, 2016, for U.S. Appl. No. 13/324,834, dated Aug. 2, 2016, 20 pages.
Response to Non-Final Office Action filed Feb. 27, 2015, for U.S. Appl. No. 13/324,834, dated Aug. 27, 2014, 23 pages.
Response to Non-Final Office Action filed Jun. 1, 2016, for U.S. Appl. No. 13/324,834, dated Mar. 9, 2016, 15 pages.
Response to Non-Final Office Action filed Nov. 13, 2013, for U.S. Appl. No. 13/324,834, dated Aug. 14, 2013, 10 pages.
Response to Rule 312 Communication filed Jun. 13, 2017, for U.S. Appl. No. 13/324,834, dated Jun. 26, 2017, 2 pages.
Final Office Action received for U.S. Appl. No. 13/339,235, dated Aug. 29, 2012, 11 pages.
Carpendale, "A Framework for Elastic Presentation Space", Burnaby, British Columbia, Simon Fraser University, Retrieved from the Internet URL: <https://www.collectionscanada.gc.ca/obj/s4/f2/dsk1/tape7/PQDD_0027/NQ51848.pdf>, 1999, 296 pages.
Du, et al., "System and Method for Online Auctions", Retrieved from the Internet URL:<https://search.proquest.com/docview/753696990?accountid=14753>, 2 pages.
Geekery, "Proposal for Free, Open Source Cell Phone Location Service", Retrieved from the Internet URL: <//crud.blog/2004/03/06/proposal-for-free-open-source-cell-phone-location-service/>, Mar. 6, 2004, 8 pages.
Keath, "21 Unique Location Examples from Foursquare", Retrieved from the Internet URL:<https://www.socialfresh.com/foursquare-case-studies/>, Jun. 1, 2010, 6 pages.
Klemperer, "Auctions: Theory and Practice", Princeton University Press, 2004, 15 pages.
Response to Final Office Action filed Apr. 8, 2016, for U.S. Appl. No. 14/486,518, dated Dec. 8, 2015, 10 pages.
Response to Non-Final Office Action filed Aug. 21, 2015, for U.S. Appl. No. 14/486,518, dated May 21, 2015, 17 pages.
Response to Non-Final Office Action filed May 1, 2017, for U.S. Appl. No. 14/486,518, dated Nov. 30, 2016, 21 pages.
Final Office Action received for U.S. Appl. No. 14/512,350, dated Nov. 30, 2015, 7 pages.
Non-Final Office Action received for U.S. Appl. No. 14/512,350, dated Mar. 11, 2016, 7 pages.
Non-Final Office Action received for U.S. Appl. No. 14/512,350, dated May 22, 2015, 10 pages.
Non-Final Office Action received for U.S. Appl. No. 14/512,350, dated Nov. 2, 2016, 14 pages.
Preliminary Amendment for U.S. Appl. No. 14/512,350, filed Nov. 26, 2014, 10 pages.
Response to Final Office Action filed Feb. 29, 2016, for U.S. Appl. No. 14/512,350, dated Nov. 30, 2015, 10 pages.
Response to Non-Final Office Action filed Apr. 3, 2017, for U.S. Appl. No. 14/512,350, dated Nov. 2, 2016, 25 pages.

(56) References Cited

OTHER PUBLICATIONS

Response to Non-Final Office Action filed Aug. 24, 2015, for U.S. Appl. No. 14/512,350, dated May 22, 2015, 20 pages.
Response to Non-Final Office Action filed Jun. 13, 2016, for U.S. Appl. No. 14/512,350, dated Mar. 11, 2016, 16 pages.
Preliminary Amendment for U.S. Appl. No. 14/534,797, filed Nov. 14, 2014, 8 pages.
Preliminary Amendment for U.S. Appl. No. 14/611,210, filed Feb. 4, 2015, 8 pages.
Preliminary Amendment for U.S. Appl. No. 14/624,083, filed Mar. 6, 2015, 9 pages.
Manninen, "Geofencing" Enables New Location-based Apps, Raises Privacy Concerns, Apr. 23, 2010, 4 pages.
Preez, et al., "System and Method for Conducting Online Auctions", Retrieved from the Internet URL: <https:/search.proquest.com/docview/753696990?accountid=14753>, 2 pages.

* cited by examiner

US 11,138,656 B2

MOBILE APPLICATION TO CONDUCT AN AUCTION BASED ON PHYSICAL PRESENCE

CLAIM OF PRIORITY

This application is a continuation of U.S. application Ser. No. 15/688,226, filed Aug. 28, 2017; which application is a continuation of U.S. application Ser. No. 13/324,834, filed on Dec. 13, 2011, now Issued as U.S. Pat. No. 9,779,450, which applications are hereby incorporated by reference in their entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2011 eBay, Inc., All Rights Reserved.

TECHNICAL FIELD

This patent document pertains generally to computer networking, and more particularly, but not by way of limitation, to a mobile application to conduct an auction based on physical presence.

BACKGROUND

For centuries, auctions have been conducted in the physical world, usually being led by a professional auctioneer who continuously announces a current highest bid for an item being sold at auction. Silent auctions may also be conducted where auction participants write down bids on pieces of paper that describe the item being sold. More recently, auctions can be conducted over the Internet where participants log into a website to bid on the item being sold.

BRIEF DESCRIPTION OF DRAWINGS

Some embodiments are illustrated by way of example and are not restricted to any limitation in the figures of the accompanying drawings.

DETAILED DESCRIPTION

In the following description, for purposes of explanation, numerous specific details are set forth in order to provide a thorough understanding of some example embodiments. It will be evident, however, to one skilled in the art that the present invention may be practiced without these specific details.

To boost sales, merchants in bricks-and-mortar stores may desire to increase a level of excitement within the store among the customers. One way to do so is to offer an item for sale at a substantially reduced price. However, a merchant may not desire to discount a price any more than necessary. Embodiments described herein allow a merchant to initiate an auction of an item for sale among the customers who are already at the store. Further, embodiments allow a merchant to conduct an auction without shifting employee resources from other job responsibilities.

While the systems and methods described herein discuss using in-store communications with customers to conduct an auction, it is understood that the systems and methods may be used more generally to distribute information to customers within the store. For example, the systems and methods described herein may be used to announce a special discount or other incentive available only to the customers presently within a predefined geographical area that includes the store.

Figure 1:
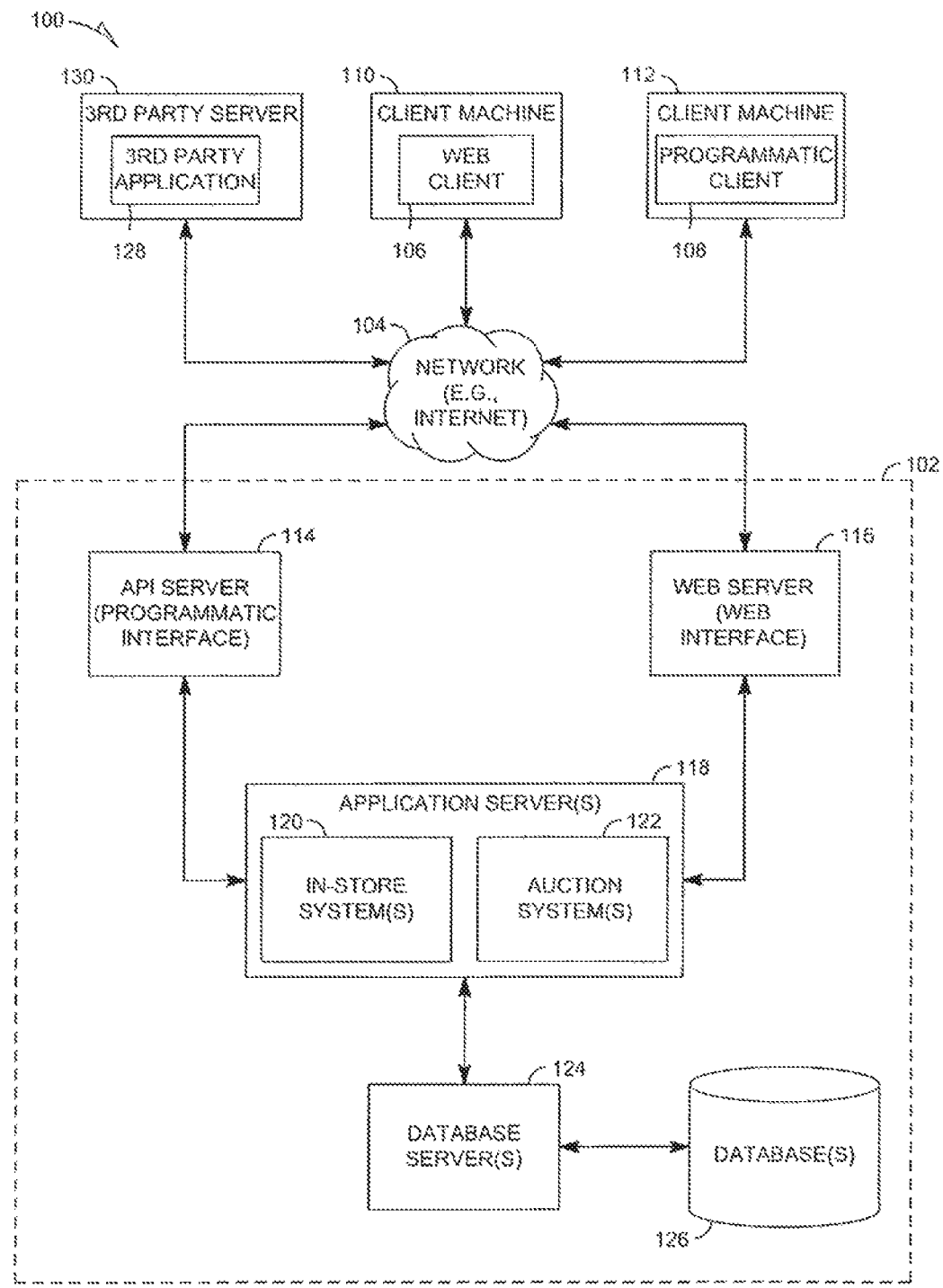
FIG. 1 is a network diagram depicting a client-server system within which one example embodiment may be deployed.

FIG. 1 is a network diagram depicting a client-server system 100, within which one example embodiment may be deployed. A networked system 102, in the example forms of a network-based marketplace or publication system for a store, provides server-side functionality, via a network 104 (e.g., the Internet or Wide Area Network (WAN)) to one or more clients. FIG. 1 illustrates, for example, a web client 106 (e.g., a browser), and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more in-store systems 120 and auction system 122. The application servers 118 are, in turn, shown to be coupled to one or more databases servers 124 that facilitate access to one or more databases 126.

The in-store system 120 may provide a number of functions and services to users that access the networked system 102. These functions may include, for example, inventory systems, accounting systems, and the like. The auction systems 122 may provide a number of auction-related services and functions to users. The auction systems 122 may allow users to identify items being auctioned, register for auctions, and bid in auctions. While the in-store system 120 and the auction system 122 are shown in FIG. 1 to both form part of the networked system 102, it will be appreciated that, in alternative embodiments, the auction systems 122 may form part of an auction service that is separate and distinct from the networked system 102.

Further, while the system 100 shown in FIG. 1 employs a client-server architecture, the present invention is of course not limited to such an architecture, and could equally well find application in a distributed, or peer-to-peer, architecture system, for example. The various in-store systems 120 and auction systems 122 could also be implemented as stand-alone software programs, which do not necessarily have networking capabilities.

The web client 106 accesses the various in-store systems 120 and auction systems 122 via the web interface supported by the web server 116. Similarly, the programmatic client 108 accesses the various services and functions provided by the in-store systems 120 and auction systems 122 via the programmatic interface provided by the API server 114. The programmatic client 108 may, for example, be a merchant application to enable merchants to author and manage auctions on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace or payment functions that are supported by the relevant applications of the networked system 102.

Figure 2:
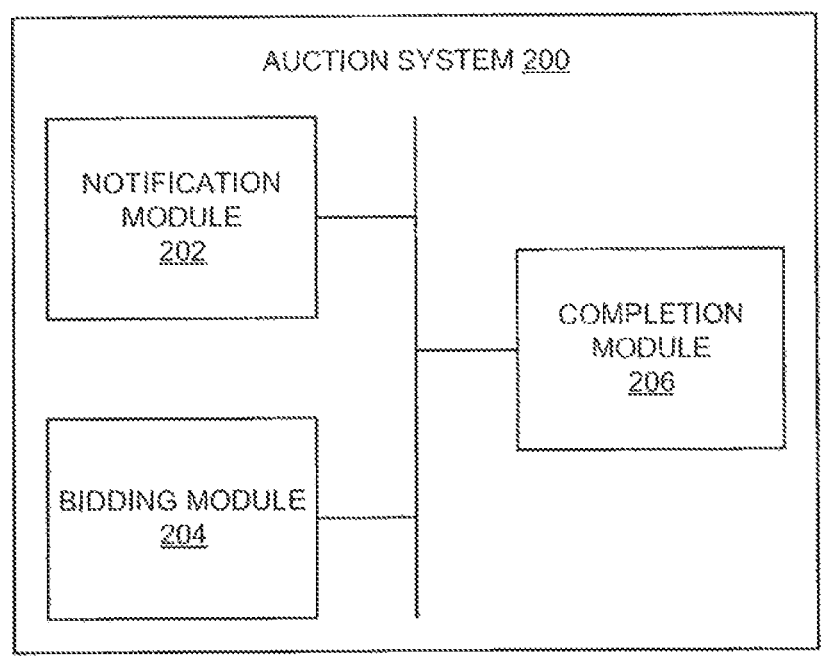
FIG. 2 is a block diagram of an auction system, according to an example embodiment.

FIG. 2 is a block diagram of an auction system 200, according to an example embodiment. The auction system 200 may be one of the auction systems 122 of FIG. 1. The auction system 200 may be implemented in hardware, software, or a combination thereof. In some instances, the auction system 200 may reside, in part, in the auction systems 122 and, in part, on a client machine (e.g., client machine 110 or client machine 112).

A notification module 202 is configured to identify an item to be auctioned and an auction time. In some instances, an auction may be pre-scheduled by a merchant or initiated based on a pre-defined trigger which is implemented by the notification module 202. In one embodiment the notification module is a memory storage device storing flash auction specific information that is used by other modules within the system to implement auction timing and configuration according to the information stored in the notification module 202. In some embodiments the notification module 202 is a control module which receives the inputs of the merchant and configures the system to implement and enable an in-store or flash auction. To illustrate, a merchant may schedule an auction for a particular item to begin at a certain time or may specify that an auction be triggered if a specified number of items remain in inventory or if an item is discontinued or otherwise no longer considered a top selling item. The notification module 202 is responsible for notifying near-by shoppers of the flash auction. In some instances, an auction may be spontaneously initiated by the merchant by providing instruction to the notification module 202 to send notifications to near-by shoppers. Some merchants may initiate an auction in response to receiving a request from a customer requesting that the merchant auction a particular item.

The auction is defined by the merchant. For example, the merchant may dictate the item(s) being auctioned, how a winner is determined, duration of the auction, a maximum or minimum number of auction participants, a qualification to participate in the auction, or the like. In auctions for a single item, the highest bid may determine the winner of the auction. Some merchants may require, for example, that a customer belong to a loyalty program or other membership to participate in the auction. In some instances, an auction may be made available to only customers who have a store credit card, or a particular spending level of the store credit card. In some embodiments, shoppers register for flash auction notifications, which they then receive when proximate the physical location of the auction initiator. The notification may include a visual description of the item for auction, which may be a drawing, a photo, a video or other descriptor.

In some instances, the merchant may use the system to initiate multiple auction processes or multiple instances of items for auction. For example, the merchant may designate a number of substantially identical items for sale to be auctioned in a single auction. The merchant may use the system to auction five television sets in a single auction, for example. In auctions where a quantity of substantially identical items is auctioned, a top number of bids may determine the winners of the auction. In other instances, a top bid may determine a first winner of the auction and the price of the item for the other bidders to optionally purchase the item.

The notification module 202, upon identifying an auction, further determines a pre-auction window. The pre-auction window is a period of time before the beginning of the auction during which customers are notified about the auction and allowed to register to participate in the auction. The pre-auction window may be, for example, ten minutes before the start of the auction. The pre-auction window may close before the start of the auction, simultaneously with the start of the auction, or after the auction has already begun.

During the pre-auction window, the notification module 202 transmits auction notification messages to client machines (e.g., a mobile device such as a smart phone) located within a pre-defined geographical area including, and in the vicinity of, the merchant's brick and mortar store. The predefined geographical area may include, for example, a parking lot, a shopping center where the merchant is located, a street or neighborhood where the store is located, or the like. The auction notification message may be an application notification, as supported by mobile operating systems such as the iOS and Android operating systems. In some instances, the auction notification message may be an SMS (short message service) message, an MMS (multimedia message service) message, or an email message. The auction notification message may include information about the auction or the item being auctioned and an option for the user to open an auction application on the client machine to register for the auction. The notification may include a map or step-by-step directions from the recipient's current location to the merchant. The notification module 202 may be dynamically adjusted for ease of use by the merchant in setting up the auction and to the shoppers to participate in the auction. In some embodiments, the shopper may choose to participate remotely rather than enter the store until completion of the auction.

To register to participate in an auction, a user of the client machine may select the notification or an option within the notification to navigate to an application installed on the client machine. To allow the user to participate, the application may automatically, without human intervention, register the user upon receiving the selection of the notification. In other embodiments, the user may register for the auction by responding to prompts requesting a user identifier, password, mobile phone number, or other information. The application may facilitate the user's participation in the auction by providing a bidding interface to the user.

The bidding module 204 is configured to conduct the auction by providing an auction interface to the client machines belonging to users participating in the auction. The client machines are located within a predefined geographical area that may include the store and the vicinity of the store. The location of the client machines may be determined based on input received from a global positioning system (GPS) or a triangulation of cell signals. In some instances, the client machines may be tracked using sensors located within the stores or using wireless tracking systems. In some embodiments, a user may check-in to the store using a Bluetooth-enabled client machine or using a check in station where a user can tell the store that the user is in the store (via near field communications (NFC) or a barcode scan). Where a shopping application is available for smart phones or other client machines, all or part of the auction system 200 may be coincident with the shopping application. In some embodiments, the auction system 200 accesses the shopping application for information, such as location of the merchant.

The auction interface provided at the client machines includes an option to bid on the item being auctioned. The auction interface may include a description of the item to be auctioned, an indication of a current high bid for the item, and one or more options to bid on the item. The bidding module 204 receives bids from the client machines and tracks the auction participants. The bidding module 204 may further determine when an auction ends. An auction may end after a predefined period of time, after a reserve price is met, or some other trigger that operates to end the auction.

Upon the ending of an auction, a completion module 206 is configured to transmit a confirmation to at least one winning auction participant. The winning auction participant may be an auction participant who has submitted a highest bid for the item during the auction. In some embodiments, an auction participant may be disqualified from winning the auction by, for example, leaving the predefined geographical area during the auction. In instances where the winning auction participant is disqualified, a second auction participant may be selected to be the winning auction participant.

In some instances, the completion module 206 may identify more than one winning auction participant if, for example, a quantity of items is being auctioned. The completion module 206 may identify the winning participants based on the participants who bid on the item. The participants may be offered the auctioned item for the bid amount submitted by the participant or for the highest bid amount submitted during the auction.

The confirmation sent by the completion module 206 may include instructions for claiming the item. For example, the confirmation message may include directions to a location (e.g., a customer service counter) within the store, a time limit in which the item can be purchased, a secret code that can be used by the store employees to confirm that the person claiming the item has actually won the auction, or the like.

In some instances, the completion module 206 may further send messages to participants who have not won the auction. The sent messages may include a discount or coupon that can be used within the store. In some embodiments, the message may include a coupon that applies a dollar amount to the recipient's next auction with the merchant.

Figure 3:
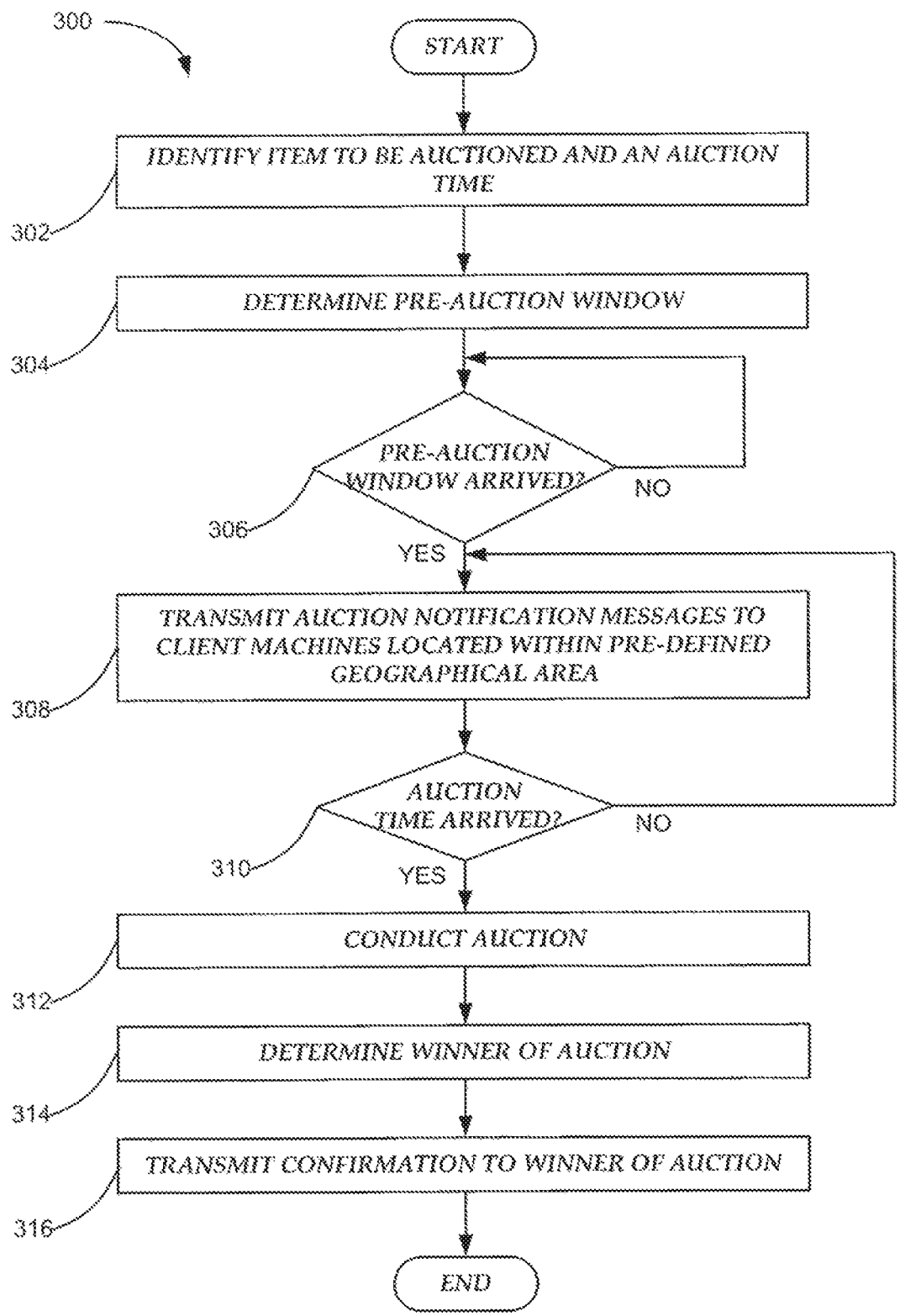
FIG. 3 is a flow chart illustrating a method to conduct an auction based on physical presence, according to an example embodiment.

FIG. 3 is a flow chart illustrating a method 300 to conduct an auction based on physical presence, according to an example embodiment. The method 300 may be performed by the auction system 200.

In an operation 302, an auction is defined by identifying an item (or quantity of items) to be auctioned and an auction time. The auction definition may include further information about the auction such as a minimum number of participants, a predefined geographical area in which to identify the participants, a reserve price to be met, and the like. In some embodiments, a recipient of an auction notification may forward the message to a member(s) of a social network to let the social network member(s) participate.

In an operation 304, a pre-auction window is determined. The pre-auction window is a period of time occurring before the auction during which shoppers may register to participate in the auction. In some embodiments the shopper may automatically register for an auction by placing a bid. In an operation 306, a determination is made as to whether the pre-auction window has arrived. If the pre-auction window has not arrived, the method 300 pauses until the pre-auction window arrives. The pre-auction window arrival may be triggered on elapsed time, a target number of users registering to participate in the auction, a time of day, and so forth.

In an operation 308, if the pre-auction window has arrived, auction notification messages are transmitted to client machines within the pre-defined geographical area. The notification may be a text message, an email, chat, tweet or other means of communication. The notification messages may include an option selectable by the user of the client machine to register for the auction. The user may register using a telephone number, a username, or some other identifier associated with the user.

In an operation 310, a determination is made as to whether the auction time has arrived. If the auction time has not arrived, auction notification messages may continue to be transmitted to client machines within the pre-defined geographical area.

If the auction time has arrived, the auction is conducted in an operation 312. The auction is conducted by accepting bids from client machines. In some instances, the client machines need not be registered prior to the auction and may be able to register during the auction by, for example, accessing an auction interface from a notification sent to the client machine and submitting a bid using the client machine.

In an operation 314, when the auction is complete, the winner of the auction is determined. The auction may be complete after a period of time has elapsed, for example. In some instances, more than one winner is identified. The winner may have submitted a highest bid during the auction.

In an operation 316, a confirmation is transmitted to the winner of the auction. The confirmation may include directions for claiming the item.

Figure 4:
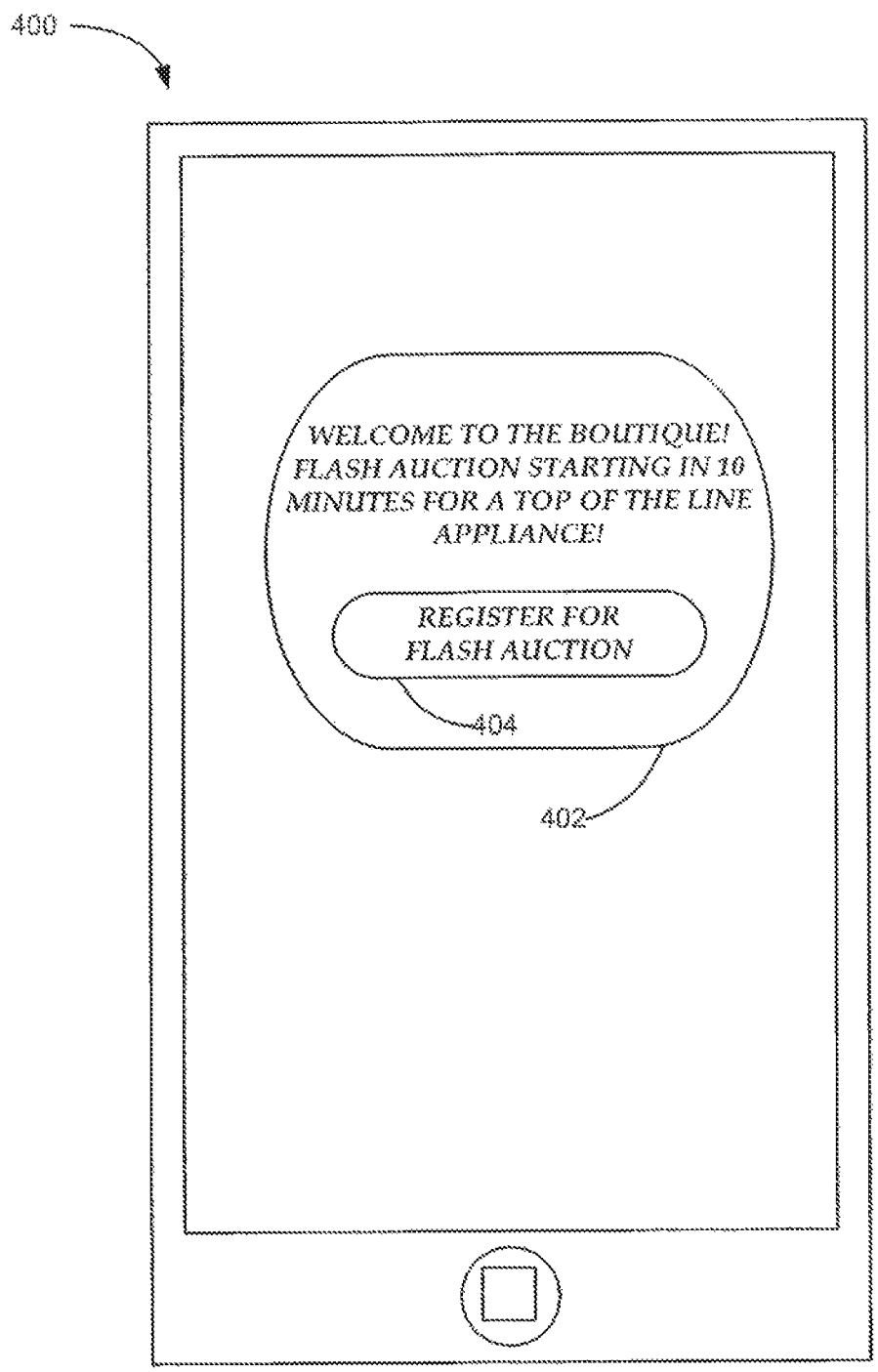
FIG. 4 depicts a portion of a user interface including an example auction notification, according to an example embodiment.

FIG. 4 depicts a portion of a user interface 400 including an example auction notification 402, according to an example embodiment. The auction notification 402 may be a message that is displayed on the screen or a portion of the screen to the user. The auction notification 402 may be temporally displayed or may only be hidden or closed by the user of the client machine. The auction notification 402 may be a text message or other message sent to the client machine. In some instances, the auction notification 402 is an application notification accessible via a mobile application residing on the client machine.

As depicted, the auction notification 402 includes an indication of the auction time and the item to be auctioned. The auction notification 402 further includes an option 404 that allows the user to register for the auction. In some instances, the user may be automatically registered upon selecting the option 404. In other instances, the user, upon selecting the option 404, may navigate to another user interface to register to participate. The user may be prompted to provide a user identifier or telephone number.

In some embodiments, shoppers may send a request to a given merchant requesting initiation of a flash auction. In this example, the merchant may respond to initiate an auction by sending a notification.

Figure 5:
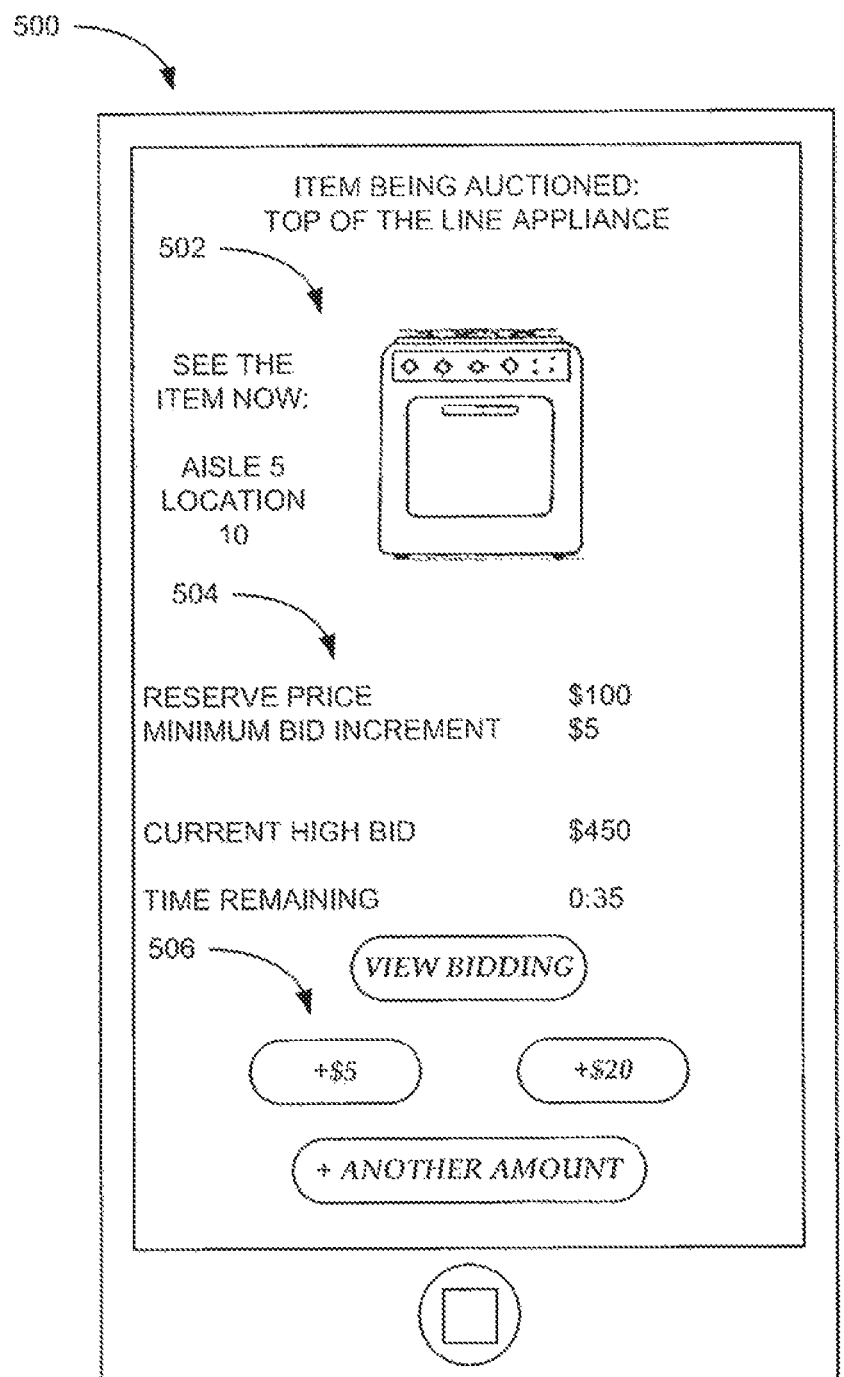
FIG. 5 depicts a portion of a user interface including an example auction interface, according to an example embodiment.

FIG. 5 depicts a portion of a user interface including an example auction interface 500, according to an example embodiment. The auction interface 500 includes a description 502 of the item being auctioned. As depicted, the description 502 includes a name of the item, an image of the item, and an indication of an in-store location of the item. Additional information may be accessible or presented to the user as part of the description 502.

An auction information portion 504 of the auction interface 500 may include information about the auction being conducted. The auction information portion 504 may include an indication of a reserve price, a minimum bid increment, a current high bid, and an amount of time remaining in the auction.

In some embodiments, an auction interface 500 may be presented to registered participants before the auction begins. Before the auction begins, the auction interface 500 may include the description 502 and the auction information portion 504. The auction information panel 504 may be modified to indicate the reserve price, the minimum bid increment, a current number of registered participants, and an amount of time remaining before the auction begins.

A bidding portion 506 of the auction interface 500 presented during the auction includes options selectable by the user to view the bidding action or to submit a bid. The bidding portion 506 may include a plurality of bidding options, such as an option to bid a minimum bid increment, a different bid increment, or a user-specified bid increment. In some instances, a user may provide a total bid amount rather than a bid increment.

Figure 6:
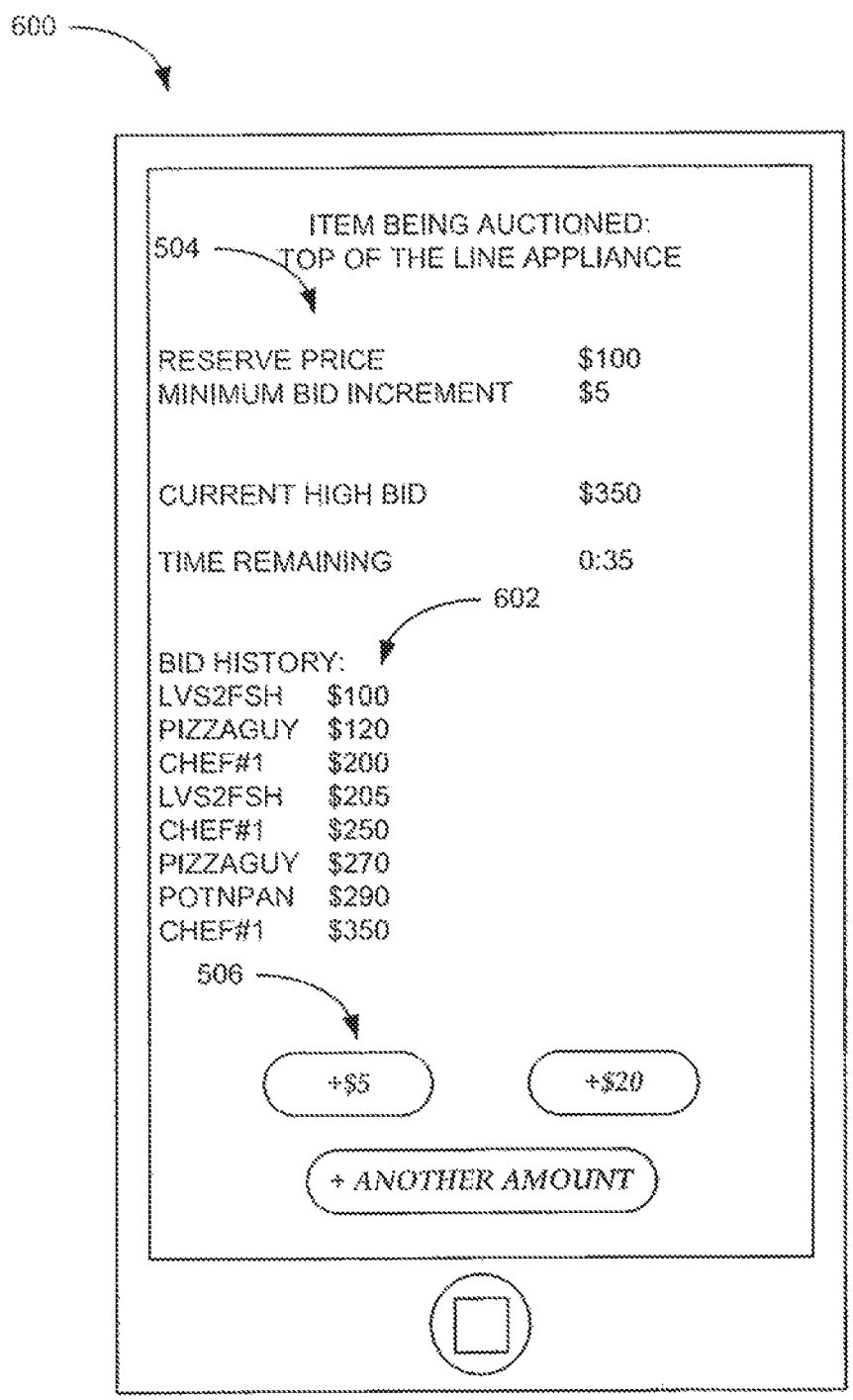
FIG. 6 depicts a portion of a user interface including an example bid history interface, according to an example embodiment.

FIG. 6 depicts a portion of a user interface including an example bid history interface 600, according to an example embodiment. The bid history interface 600 may be accessible from the auction interface 500 by selecting an option to view bidding. The bid history interface 600 includes the auction information panel 504 and the bidding portion 506. The bid history interface 600 additionally includes a list 602 of the bids previously submitted by the auction participants. The list 602 identifies the bidders and the bid submitted by each bidder.

Figure 7:
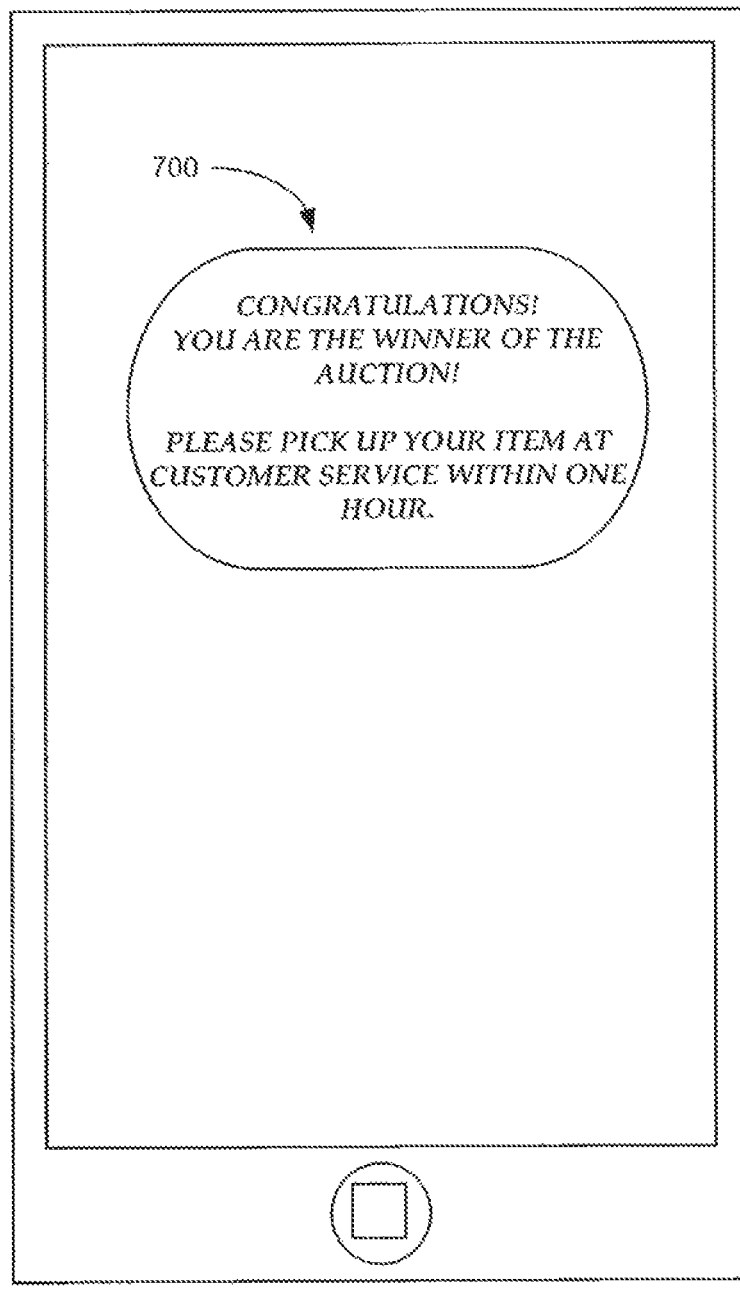
FIG. 7 depicts a portion of a user interface including an example confirmation, according to an example embodiment.

FIG. 7 depicts a portion of a user interface including an example confirmation 700, according to an example embodiment. As depicted, the confirmation 700 is a notification. The confirmation 700 may be another message sent to the client machine. The confirmation 700 includes an indication that the user of the client machine has won the auction and provides instructions for completing the auction transaction. The confirmation 700 may include additional information, such as a final price of the item, a secret code to allow the employees of the store to confirm the identity of the winner or winners, or the like. In some instance, the confirmation 700 may include a barcode encoded with info identifying customer as auction winner where the barcode is capable of being scanned from the display of the client machine.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and
Machine-Readable Medium

Figure 8:
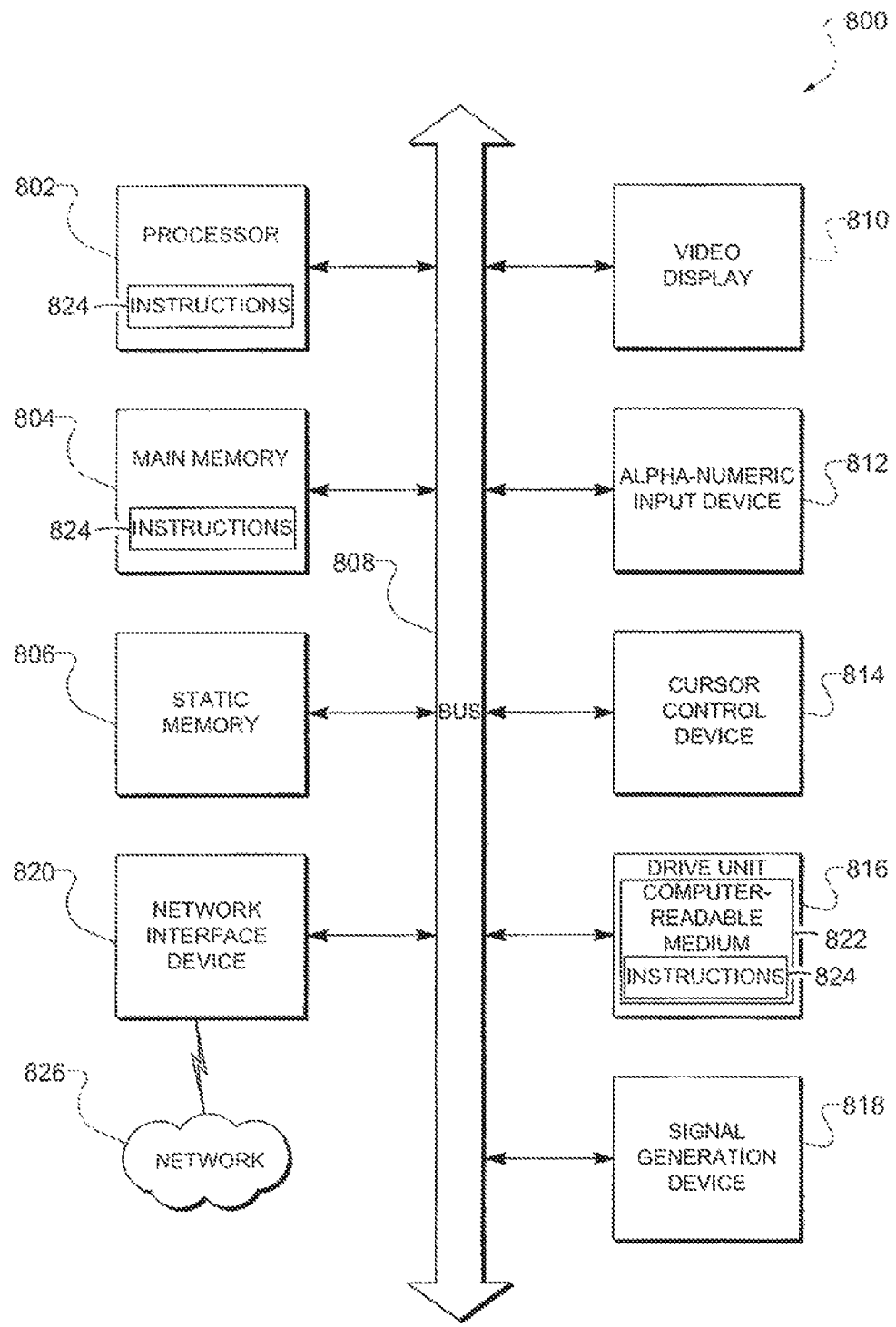
FIG. 8 is a block diagram of machine in the example form of a computer system within which a set instructions, for causing the machine to perform any one or more of the methodologies discussed herein, may be executed.

FIG. 8 is a block diagram of machine in the example form of a computer system 800 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU) or both), a main memory 804 and a static memory 806, which communicate with each other via a bus 808. The computer system 800 may further include a video display unit 810 (e.g., a liquid crystal display (LCD) or a cathode ray tube (CRT)). The computer system 800 also includes an alphanumeric input device 812 (e.g., a keyboard or touch-sensitive display screen), a user interface (UI) navigation device 814 (e.g., a mouse), a disk drive unit 816, a signal generation device 818 (e.g., a speaker) and a network interface device 820.

Machine-Readable Medium

The disk drive unit 816 includes a machine-readable medium 822 on which is stored one or more sets of instructions and data structures (e.g., software) 824 embodying or utilized by any one or more of the methodologies or functions described herein. The instructions 824 may also reside, completely or at least partially, within the main memory 804 and/or within the processor 802 during execution thereof by the computer system 800, the main memory 804 and the processor 802 also constituting machine-readable media.

While the machine-readable medium 822 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 824 may further be transmitted or received over a communications network 826 using a transmission medium. The instructions 824 may be transmitted using the network interface device 820 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
    detecting a plurality of location-enabled client devices associated with users and located within a pre-configured physical location, each of the plurality of location-enabled client devices having a mobile device auction application;
    determining that each user of the users is pre-registered with a seller associated with one or more items;
    detecting a current time falls within a predefined pre-auction time window of a mobile auction;
    in response to the detecting and the determining that each user of the users is pre-registered with the seller, transmitting electronic notifications to the plurality of location-enabled client devices, each of the electronic notifications indicating that the mobile auction for the one or more items being sold by the seller is to occur via the mobile device auction application;
    initiating the mobile auction in response to a pre-configured time arriving; and
    receiving, after the pre-configured time, from one or more of the plurality of location-enabled client devices, one or more bid interactions for the mobile auction, the one or more bid interactions input via the mobile device auction application.

2. The method of claim 1, wherein the electronic notifications include a user interface button configured to open the mobile device auction application and provide for registration with the mobile auction.

3. The method of claim 1, herein the electronic notifications are mobile device operating system (OS) notifications.

4. The method of claim 1, wherein the electronic notifications are network service message notifications.

5. The method of claim 4, wherein the network service message notifications include at least one of:
    short message service (SMS) notifications, or multimedia service (MMS) notifications.

6. The method of claim 1, wherein each of the plurality of location-enabled client devices comprises a wireless sensor.

7. The method of claim 6, wherein the wireless sensor is at least one of: a global positioning service (GPS) sensor.

8. The method of claim 6, wherein the detecting of the plurality of location-enabled client devices comprises determining each of the plurality of location-enabled client devices is within the pre-configured physical location based on data generated by the respective location-enabled client device's wireless sensor.

9. The method of claim 1, wherein each of the electronic notifications includes directions to a location of one or more items of the mobile auction, the directions included in each electronic notification with respect to a current location of a client device of the plurality of location-enabled client devices receiving the respective electronic notification.

10. The method of claim 1, wherein the pre-configured physical location includes a vicinity surrounding a physical place.

11. The method of claim 1, further comprising:
    transmitting an electronic confirmation to a client device, wherein the electronic confirmation indicates a predetermined period of time during which the one or more items are available for purchase, the client device being one of the plurality of location-enabled client devices.

12. The method of claim 1, wherein the mobile auction auctions a plurality of substantially identical items.

13. The method of claim 12, further comprising:
determining a number of winning auction participants based on a quantity of the plurality of substantially identical items and bids received.

14. The method of claim 1, wherein the electronic notifications indicate a time remaining before the pre-configured time that the mobile auction is initiated.

15. A system comprising:
one or more hardware processors of a machine; and
a memory storing instructions that, when executed by the one or more hardware processors, cause the machine to perform operations comprising:
  detecting a plurality of location-enabled client devices associated with users and located within a pre-configured physical location, each of the plurality of location-enabled client devices having a mobile device auction application;
  determining that each user of the users is pre-registered with a seller associated with one or more items;
  detecting a current time falls within a predefined pre-auction time window;
  in response to the detecting and the determining that each user of the users is pre-registered with the seller, transmitting electronic notifications to the plurality of location-enabled client devices located within the pre-configured physical location, each of the electronic notifications indicating that a mobile auction for the one or more items being sold by the seller is to occur via the mobile device auction application;
  initiating the mobile auction in response to a pre-configured time arriving; and
  receiving, after the pre-configured time, from one or more of the plurality of location-enabled client devices, one or more bid interactions for the mobile auction, the one or more bid interactions input via the mobile device auction application.

16. The system of claim 15, wherein the electronic notifications include a user interface button configured to open the mobile device auction application and provide for registration with the mobile auction.

17. The system of claim 15, wherein the electronic notifications are mobile device operating system (OS) notifications.

18. The system of claim 15, wherein the electronic notifications are network service message notifications.

19. A non-transitory machine-readable storage medium embodying instructions that, when executed by a machine, cause the machine to perform operations comprising:
  detecting a plurality of location-enabled client devices associated with users and located within a pre-configured physical location, each of the plurality of location-enabled client devices having a mobile device auction application;
  determining that each user of the users is pre-registered with a seller associated with one or more items;
  detecting a current time falls within a predefined pre-auction time window;
  in response to the detecting and the determining that each user of the users is pre-registered with the seller, transmitting electronic notifications to the plurality of location-enabled client devices located within the pre-configured physical location, each of the electronic notifications indicating that a mobile auction for the one or more items being sold by the seller is to occur via the mobile device auction application;
  initiating the mobile auction in response to a pre-configured time arriving; and
  receiving, after the pre-configured time, from one or more of the plurality of location-enabled client devices, one or more bid interactions for the mobile auction, the one or more bid interactions input via the mobile device auction application.

20. The non-transitory machine-readable storage medium of claim 19, wherein the electronic notifications include a user interface button configured to open the mobile device auction application and provide for registration with the mobile auction.

* * * * *